United States Patent [19]

Bauer

[11] 4,041,366
[45] Aug. 9, 1977

[54] VOLTAGE MULTIPLIER ARRANGEMENT

[75] Inventor: Werner Bauer, Nurnberg, Germany

[73] Assignee: International Standard Electric Corporation, New York, N.Y.

[21] Appl. No.: 660,528

[22] Filed: Feb. 23, 1976

[51] Int. Cl.² .............................................. H02M 7/10
[52] U.S. Cl. ...................................................... 363/61
[58] Field of Search ................ 321/8 C, 15; 317/256; 178/DIG. 11; 315/411

[56] References Cited

U.S. PATENT DOCUMENTS

| 2,731,589 | 1/1956 | Marsh | 321/15 |
| 2,985,812 | 5/1961 | Peterson | 321/15 |
| 3,225,258 | 12/1965 | Brekoo et al. | 321/15 |
| 3,927,364 | 12/1975 | Bauer | 321/15 |

FOREIGN PATENT DOCUMENTS

| 2,420,452 | 6/1975 | Germany | 321/15 |

Primary Examiner—William H. Beha, Jr.
Attorney, Agent, or Firm—John T. O'Halloran; Thomas M. Marshall

[57] ABSTRACT

A voltage multiplier device is disclosed in which the capacitors are arranged and formed in a hollow cylindrical shape and the diodes are interconnected in a zigzag pattern along the outer circumference of the tubular capacitor roll. The device of this invention has particular use for generating the beam acceleration voltage in television picture tubes. The interior of the tubular capacitor roll has space and mounting means associated therewith which permit the device to be mounted on one arm of the magnetic core of a line transformer. The entire device, with the exception of the terminals and connector elements, are built into an insulated casing which is sealed with a sealing compound or formed into the shape of the block with the aid of a casting resin.

18 Claims, 4 Drawing Figures

VOLTAGE MULTIPLIER ARRANGEMENT

BACKGROUND OF THE INVENTION

1. Field of the Invention

Voltage multiplier arrangements.

2. Prior Art

Voltage multiplier arrangements comprising diodes and capacitors are known. In the arrangement shown in the prior art, various types of diodes and capacitors have been used, for example as diodes, there are used selenium rectifiers or silicon rectifiers. As capacitors, either ceramic or paper capacitors have been employed. All such components must satisfy the inherent requirements in high voltage multiplier arrangements. Furthermore the individual components must not only be dimensioned in accordance with the high voltage which is applied, but the individual connecting points between the components must also be sufficiently insulated from one another in order to avoid voltage flashovers. In the past it has been the practice to insulate the individual parts from each other and also with respect to the environment in such a way that the components of the voltage multiplier arrangement have either been built into an insulated casing, sealed with an insulating compound or directly sealed into the shape of a block with the aid of a casting resin. Because of the size of the individual components of a voltage multiplier arrangement, and the necessary spaced relationship between them, certain overall dimensions are necessary which cannot be made smaller without considerable danger of problems developing where a voltage multiplier arrangement is utilized in a television receiver. The arrangement must be suitably secured to the chassis of the receiver and at the same time there must be a prescribed spacing from the other components. When it is taken into account that a line transformer exists in the television receiver as another high voltage component and because of the high voltage it produces, likewise requires a certain spaced relation from the other components. A relatively large space requirement is involved in order to contain the high voltage stage of television receivers which has up to now been unavoidable.

From German Petty Patent No. 7,336,894, there is known to combine the line transformer winding with a voltage multiplier arrangement to form one unit. In the arrangement disclosed therein there is, however, no multiple high voltage capacitor roll and the device illustrated has a disadvantage that the multiplier arrangement cannot be manufactured separately but instead must be built at the same time with a high voltage winding. Furthermore, there are unfavorable mutual influences, including the heating of the high voltage winding of the transformer and the voltage multiplier arrangement, which are unavoidable.

SUMMARY OF THE INVENTION

It is the object of this invention to overcome the disadvantages in prior art devices and thereby to reduce the space requirement in equipment where voltage multiplier arrangements are used. This object is achieved by the voltage multiplier arrangement of this invention which has a suitably smaller space requirement. Furthermore the voltage multiplier arrangement of this invention is designed so that it may be combined easily with other component parts thus reducing the total space requirement inside the receiver. Furthermore, by combining the voltage multiplier arrangement with a further component part, for example the line transformer, it is possible to achieve considerable saving of the time required for assembling the television receiver.

The voltage multiplier arrangement of this invention includes capacitors which are formed into a tubular multiple high voltage capacitor roll and the diodes are arranged in a zigzag form along the outer circumference along the capacitor roll. This results in a very compact construction which is substantially smaller as compared to conventional types of arrangements. Furthermore by using a tubular multiple high voltage capacitor roll it is possible to combine the voltage multiplier arrangement with the line transformer so that the space required for those two units inside the receiver is substantially reduced and the parts thus combined can be assembled in a single operation which results in a substantial saving of time and assembly.

In one form of the invention the tubular multiple high voltage capacitor roll is provided with means which permit it to be mounted onto the magnetic core of the line transformer. This avoids the problems mentioned above with respect to German Petty Patent No. 7,336,894 since the transformer and the voltage multiplier arrangement can be manufactured separately and the unfavorable mutual influences encountered in the prior art are avoided, including the heating problem between the high voltage winding of the transformer and the voltage multiplier arrangement described above.

As the dielectric material for the multiple high voltage capacitor roll of this invention combinations of high voltage resistant dielectric foils and heat resistant dielectric foils may be used. Preferably the material utilized is a multilayer dielectic consisting of polypropylene and/or polycarbonate and/or polysterene foils. In forming the multiple high voltage capacitor roll of this invention a mandrel of tubular shape is utilized on which the dielectric material is wound. The diameter of the mandrel is chosen so that the tube formed arrangement can be easily mounted onto one limb of one line transformer. In those embodiments where the multiple high voltage capacitor roll is accommodated inside a casing, the tubular core of the winding may simultaneously form part of the casing. The diodes utilized are arranged in zigzag fashion along the outer circumference of the winding, preferably only along a part of that circumference, results in a very compact and easy to manufacture structural unit. In a particularly advantageous embodiment of this invention those capacitors in the roll which are to be connected to the a.c. voltage terminal are positioned on the outside of the roll whereas the capacitors to be connected to the d.c. terminal are arranged inside the roll.

In order to decouple the capacitors connected to the a.c. voltage from those connected to the d.c. voltage, it is also particularly advantageous, to provide for several vacant turns of dielectric foil between them. The terminals for the d.c. voltage side are brought out on one face side of the multiple roll and the terminals for the a.c. voltage are lead out on the opposite face side providing for very short connecting paths among the diodes. In order to avoid a heat transfer between the device of this invention and the magnetic core of a line transformer, the cylindrical hollow space inside the multiple high voltage capacitor roll is large enough to permit air to sweep or flow between the two component parts. In order to provide for uniform spacing, spacing members or projections are arranged inside the hollow cylindrical space of the capacitor roll which serve to receive the magnetic core of the line transformer.

In a manner known to the art the arrangement of this invention is either sealed to form a solid block using a casting resin or may be built into a casing of insulating material which is to be filled with a suitable insulation material.

DESCRIPTION OF THE PREFERRED EMBODIMENT

Figure 1:
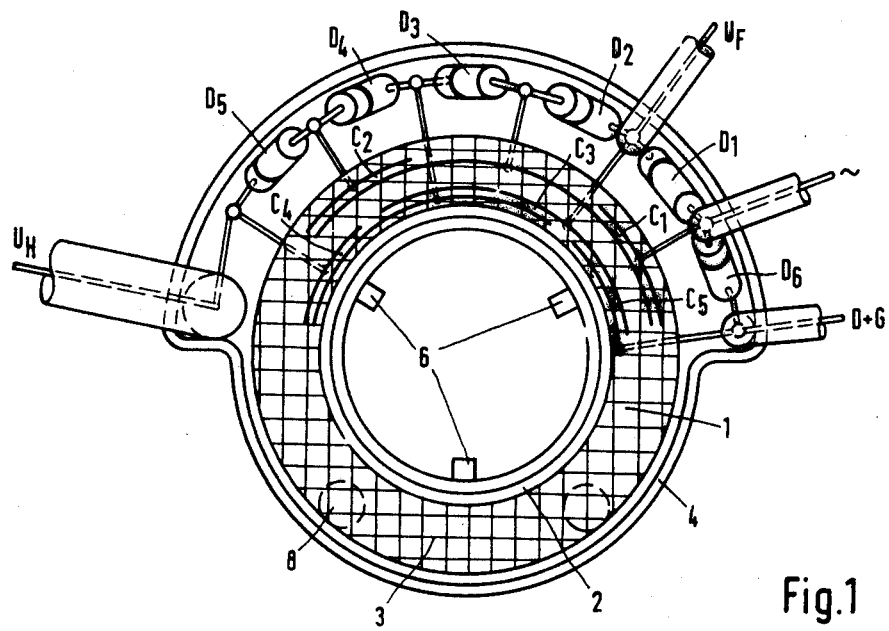
FIG. 1 is a top view of the voltage multiplier arrangement of this invention built into a casing prior to the time the casing is sealed.
Figure 3:
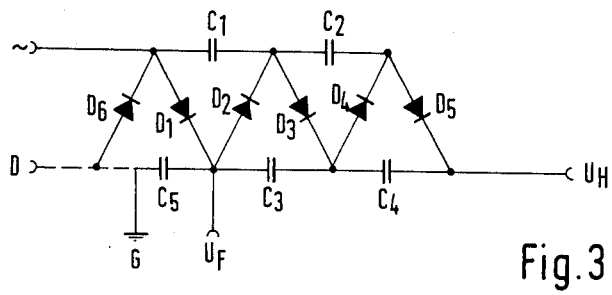
FIG. 3 is a schematic diagram illustrating the electrical connections between the individual components of the arrangement of this invention, as well as the arrangement of the terminals.

In the device illustrated in FIG. 1, capacitors C1 to C5 are combined to form a multiple high voltage capacitor roll 1 which is wound onto tubular core 2. The electrodes of the individual capacitors are denoted schematically as extending only partially around the roll, when in fact they extend around the entire roll. The connections between the individual components schematically illustrated in FIG. 1 and to the terminals or leads corresponds to the schematic illustration of the circuit shown in FIG. 3. The diodes D1 to D6 are arranged concentrically around the high voltage capacitor roll 1 along a portion of its circumference. In the drawings the terminals or leads are identified as follows: ~ is for the a.c. voltage input terminal; $U_H$ is for the d.c. voltage output terminal; G is for the ground terminal; $U_F$ is for the focus voltage output terminal; and D is an additional terminal making a connection in the television receiver. A plurality of turns of the dielectric, as indicated at reference number 3 in FIG. 1, serves the purpose of decoupling the capacitor rolls connected to the a.c. voltage side and the capacitor voltage connected to the d.c. voltage side.

The entire arrangement is built into a casing 4 of insulating material substantially designed to have the shape of a hollow cylinder having a concentric attachment in the shape of a partial cylinder serving to receive diodes D1 through D6. On the inside of the cylinder spacing members 6 are cast in the axial direction of the cylinder to prevent the arrangement from being directly attached to the magnetic core of the line transformer. Once the components and terminals have been inserted, the entire arrangement inside the casing 4 is sealed, utilizing a suitable insulation material such as a casting resin.

Figure 2:
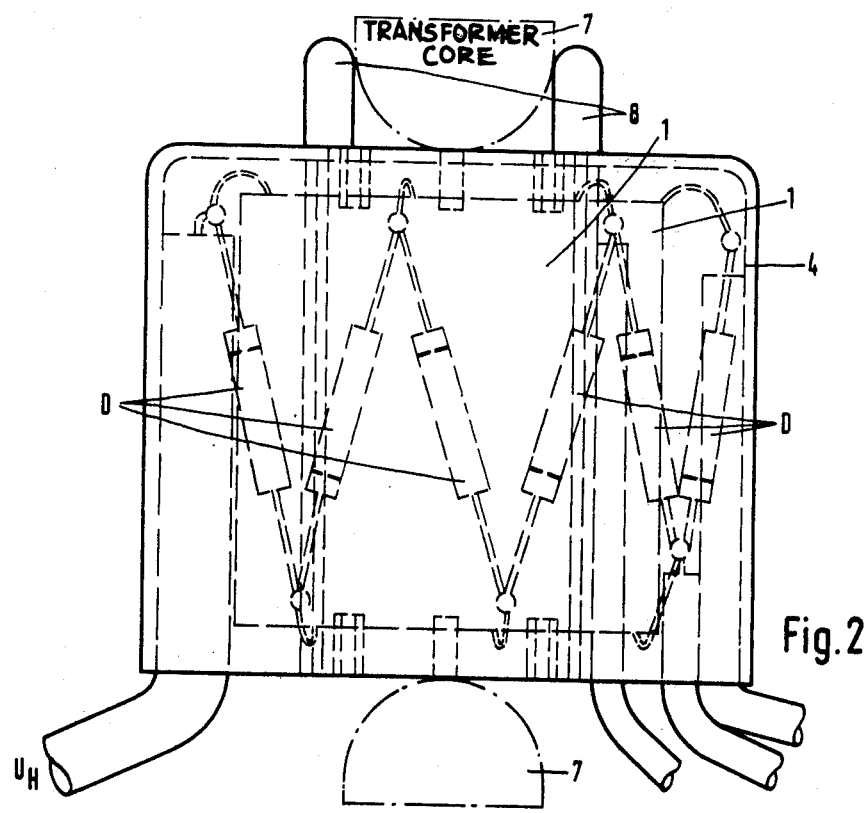
FIG. 2 is a side view of the arrangement of this invention as mounted on the core of a transformer, with only one-half of the core being shown.

FIG. 2 shows a side view of the multiplier arrangement of this invention as plugged onto the magnetic core 7 of the line transformer. This allows the mutual arrangement of both the multiple rolls capacitor roll 1 and the diodes D, and specifically illustrates the zigzag arrangement of the diodes on the outside of the multiple capacitor roll 1. Two of the diodes are always arranged next to each other on one side of the roll and are connected to each other and to one terminal on the face side of the roll. Two pin shaped projections 8 on the insulating material envelope extend over a portion of the transformer core 7 to prevent the arrangement from being turned on the transformer core 7. This is of particular importance since mechanically stressing of the high voltage leads between the transformer winding and the multiplier arrangement must be avoided in every case.

Figure 4:
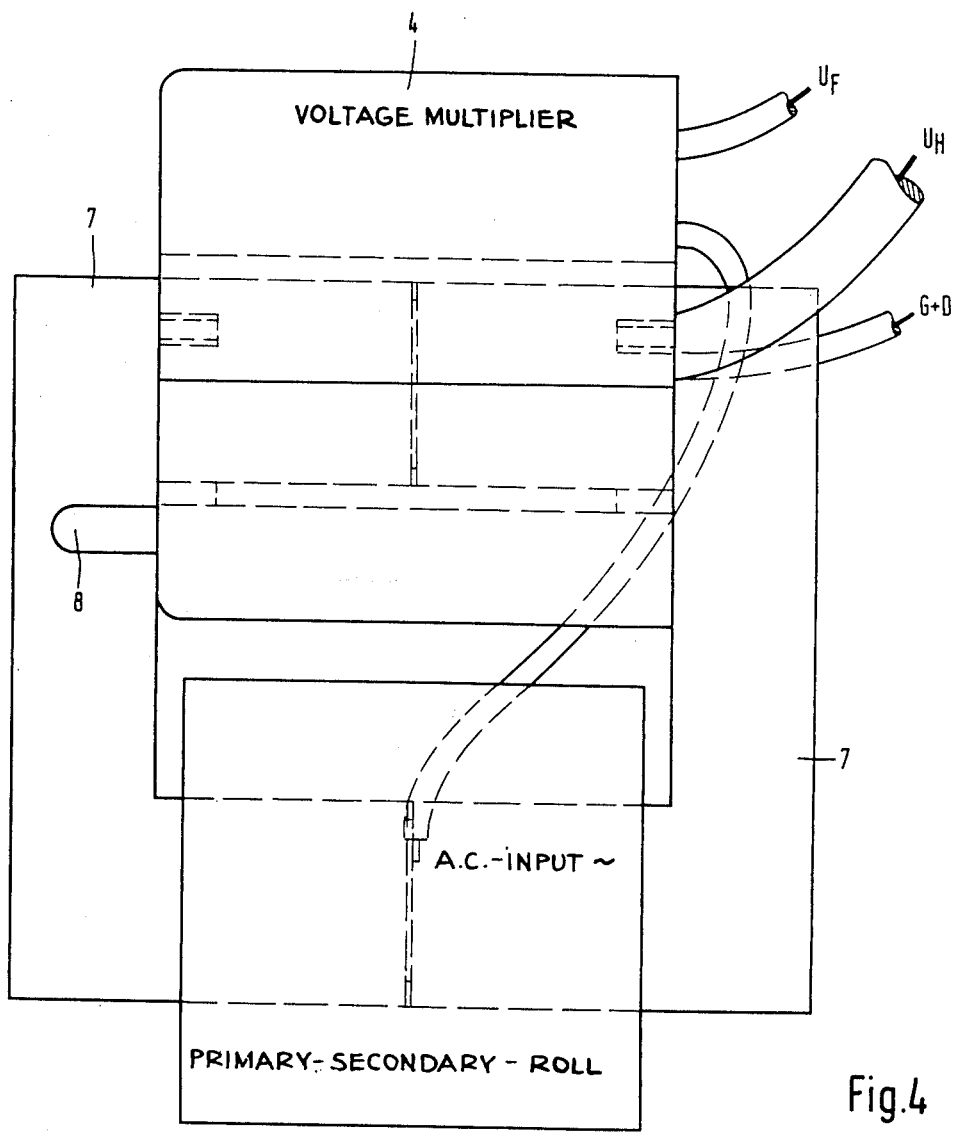
FIG. 4 illustrates one form of this invention showing a line transformer comprising a primary and a secondary winding and the voltage multiplier arrangement of this invention disposed on one limb of the magnetic core of the line transformer.

FIG. 4 is a top view showing a line transformer with its magnetic core 7 and with primary and secondary windings on one limb. The voltage multiplier arrangement 4 of this invention is connected to the other limb of the transformer core 7 extending through the hollow spacing of the multiplier arrangement 4. The pins 8 grip over the angled off portion of the transformer core 7 and thus form a protection against rotation of the voltage multiplier arrangement.

It should be particularly noted that the combination of elements illustrated in FIG. 4 results in a very compact high voltage (EHT) unit for use in television receivers which requires only slightly more space than the line transformer alone and also provides a device which can be mounted on the chassis of the reciver in the course of one single operation.

As pointed out above the capacitor roll 1 uses combinations of high voltage resistant dielectric foils and heat resistant dielectric foils. Preferably the multilayer dielectric consisting of polypropylene and/or polycarbonate and/or polystyrene foils. Furthermore, it will be noted in the arrangement as illustrated that the terminals or leads for the d.c. voltage side come out on one face of the multiple roll and the leads for the a.c. voltage side come out on the opposite face side resulting in very short connecting paths between the diodes. In the arrangement as illustrated in FIGS. 2 and 4 the hollow space of the cylindrical element 4 permits the flow of air therethrough which assists in cooling the device. Furthermore, it will be noted that the projections 6 on the interior of the hollow cylinderical member 4 prevents the member 4 from touching the transformer core and also provides a uniform space between those two elements.

It will be further noted that the shape of the casing 4 is a hollow cylinder with a further partial cylinder, arranged to receive diodes outside the capacitor roll, in which the diodes D are positioned concentrically arranged in the zigzag pattern illustrated in FIG. 2 and as seen from the top in FIG. 1.

It will also be noted in the device illustrated in the figures that the terminals or leads are brought out on only one face side. They may be guided at marginal portions in either recesses or cavities provided for in the casing of the insulation material in order to fix and position them and to prevent the sealing compound grommets from becoming leaky.

While the device of this invention has been illustrated in a specific embodiment and its use illustrated and described in connection with a line transformer, it will be appreciated by those skilled in the art that minor modifications may be made without departing from the scope of the appended claims.

What is claimed is:

1. A voltage multiplier arrangement having a multiplicity of interconnected diodes and capacitors, including input and output connections to both a.c. and d.c. terminals wherein said capacitors are formed into a tubular multiple high voltage capacitor roll and said diodes are arranged in zigzag form along the outer circumference of said roll.

2. The voltage multiplier arrangement in accordance with claim 1, wherein capacitors connected to the a.c. terminal are arranged along the outer circumference of the roll.

3. The voltage multiplier arrangement in accordance with claim 2, wherein said capacitors connected to the d.c. terminal are arranged along the inner circumference of the roll and a plurality of turns of dielectric material are positioned between said capacitors connected to the d.c. terminal and the capacitors connected to the a.c. terminal.

4. The voltage multiplier arrangement in accordance with claim 3, wherein terminals for said a.c. capacitors and terminals for the said d.c. capacitors are brought out on opposite face sides of said multiple capacitor roll.

5. The voltage multiplier arrangement in accordance with claim 3, wherein all connecting terminals of said arrangement are lead out on only one face side of said roll.

6. The voltage multiplier arrangement in accordance with claim 1, wherein said tubular multiple roll is in the form of a hollow cylinder, said hollow cylinder having an internal diameter adapted to permit said arrangement to be plugged onto the magnetic core of a line transformer.

7. The voltage multiplier arrangement in accordance with claim 1, wherein said diodes are arranged concentrically along only a portion of circumference of said multiple capacitor roll.

8. The voltage multiplier arrangement in accordance with claim 7, wherein adjacent diodes are alternately connected on opposite sides of said multiple roll to one another and to terminals on the face side of said roll.

9. The voltage multiplier in accordance with claim 8 wherein said arrangement is embedded in an insulating compound.

10. The voltage multiplier arrangement in accordnace with claim 9, wherein said arrangement is sealed to form a block utilizing casting resin therefor.

11. The voltage multiplier arrangement in accordance with claim 9, wherein said arrangement is built into a casing of said insulating material which is filled with an insulating compound.

12. The voltage multiplier arrangement in accordance with claim 11, wherein said casing has the shape of a hollow cylindrical body on which there is a partial cylinder of larger diameter formed therein which is less than the entire circumference of said hollow cylindrical body.

13. The voltage multiplier arrangement in accordance with claim 12, wherein said casing is an envelope provided with projections extending from the ends thereof whereby when said arrangement is plugged onto the limb of a line transformer said projections co-operate with another limb of said line transformer to prevent said arrangement from being turned or twisted.

14. The voltage multiplier arrangement in accordance with claim 13, wherein said projections are formed by two pin-shaped projections cast on the face side of said envelope.

15. The voltage multiplier arrangement in accordance with claim 12, wherein spacing members are cast on the inner portion said hollow cylinder body.

16. The voltage multiplier arrangement in accordance with claim 12, wherein the rim portion of said casing is provided on one face side with shaped portions to guide terminals which project to the exterior of said casing.

17. A high voltage section for a television receiver having a line transformer and a voltage multiplier arrangement wherein said voltage multiplier arrangement comprises a hollow cylindrical tubular multiple high voltage capacitor roll and multiplicity of diodes interconnected thereto, said arrangement having input and output connections to both a.c. and d.c. terminals in said receiver, one limb of said line transformer being positioned inside the hollow space of said capacitor roll and spacing members formed on the inside of said tubular multiple roll for preventing heat transfer between said elements and for holding said roll in a fixed position with respect to said limb of said line transformer.

18. The device of claim 7, wherein said spacing members extend longitudinally in parallel relation to the axis of said capacitor roll.

* * * * *